Feb. 6, 1934.  J. T. CATLETT  1,946,305
WELDING APPARATUS
Filed May 1, 1931  2 Sheets-Sheet 1
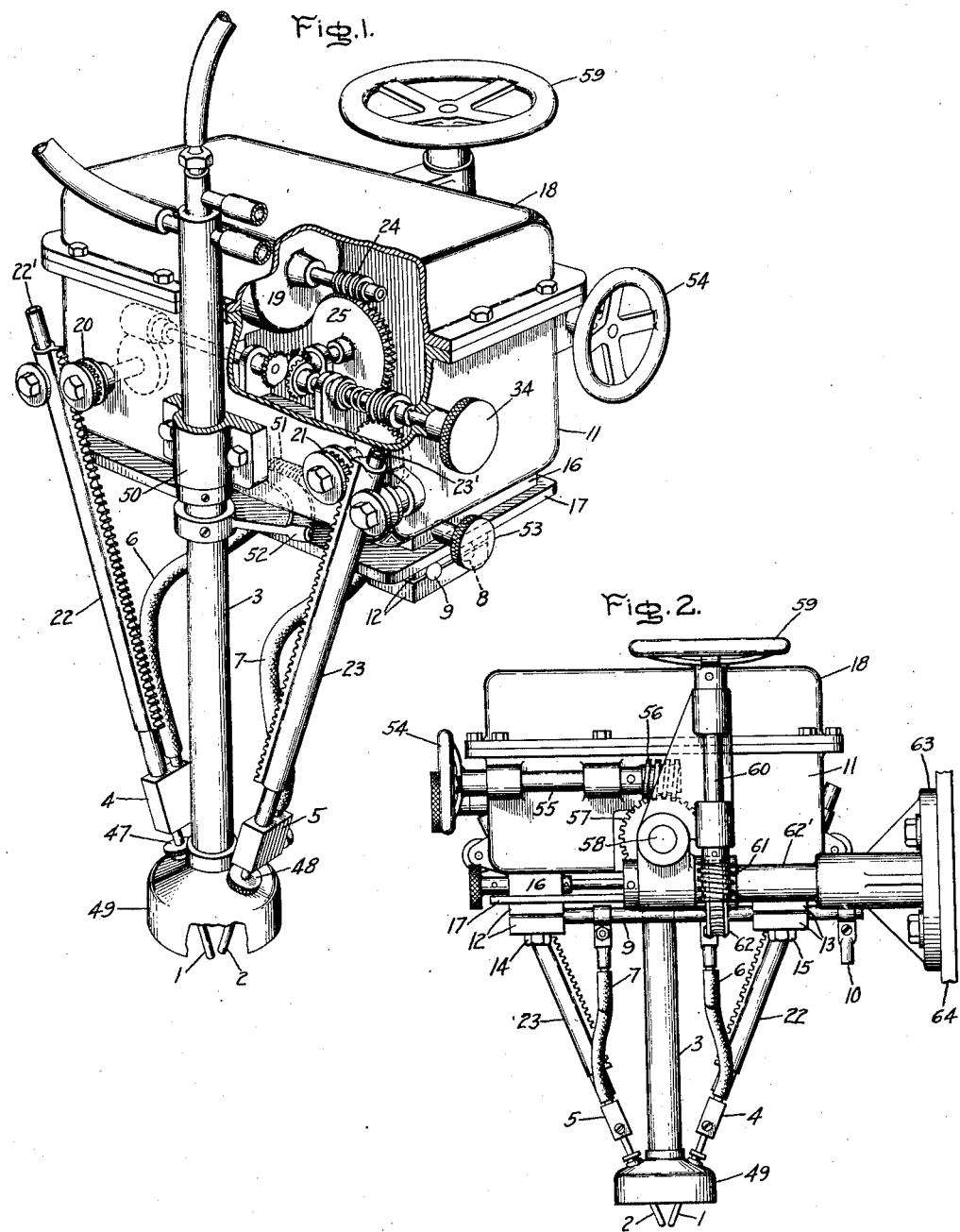
Inventor:
James T. Catlett,
by Charles E. Mullan
His Attorney.

Feb. 6, 1934.    J. T. CATLETT    1,946,305
WELDING APPARATUS
Filed May 1, 1931    2 Sheets-Sheet 2
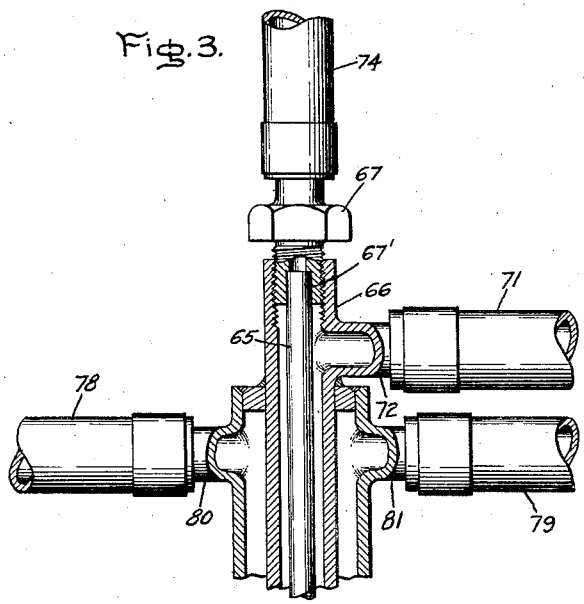
Fig. 3.
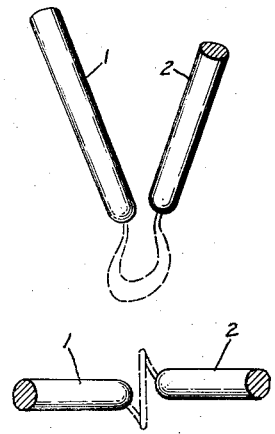
Fig. 6.
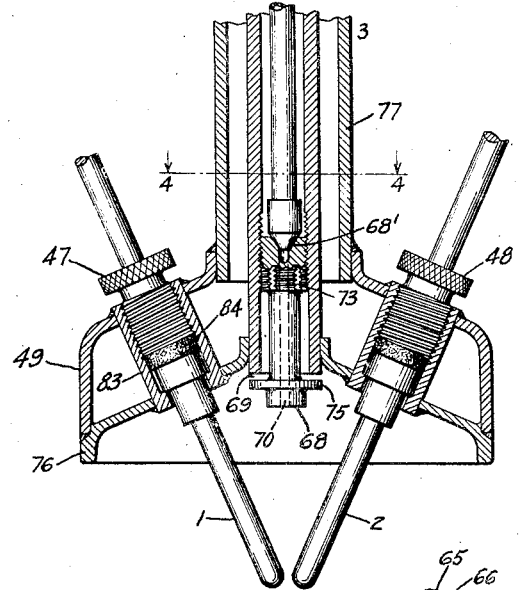
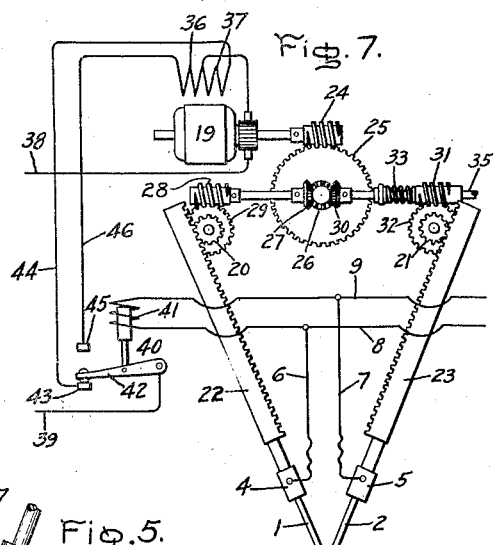
Fig. 7.
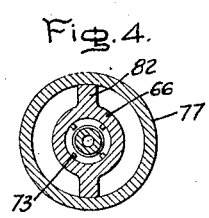
Fig. 4.
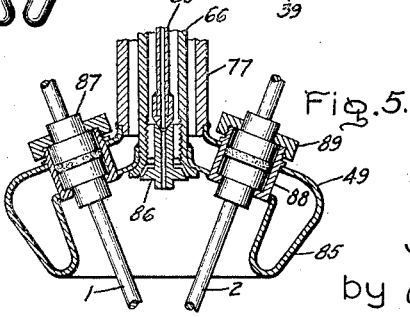
Fig. 5.
Inventor:
James T. Catlett,
by Charles E. Mullan
His Attorney.

Patented Feb. 6, 1934

1,946,305

UNITED STATES PATENT OFFICE 1,946,305

WELDING APPARATUS

James T. Catlett, Schenectady, N. Y., assignor to General Electric Company, a corporation of New York Application May 1, 1931. Serial No. 534,362

17 Claims. (Cl. 219—8)

My invention relates to welding, and more particularly to gas-arc welding.

My invention is particularly applicable in the utilization of the heating effects of flames of atomic hydrogen. The utilization of such atomic hydrogen flames is disclosed and claimed broadly in the copending application of Irving Langmuir, Serial No. 729,185, filed July 30, 1924, for Heating process and apparatus, which application is assigned to the same assignee as the present application.

While my invention is well suited for atomic hydrogen welding, many features of construction thereof are of general application to that type of welding apparatus wherein an arc is maintained between a plurality of electrodes or an electrode and the work and a gas or gases are supplied to the arc and about the arcing terminals of the electrodes and the work. These forms of welding I refer to as gas-arc welding.

It is an object of my invention to provide apparatus suitable for automatically welding by the gas-arc method.

It is a further object of my invention to provide means for establishing a stable arc between a plurality of electrodes.

Another object of my invention is to employ, in conjunction with a plurality of electrodes whose arcing terminals are placed adjacent the work, means for supplying a jet of gas across the arcing terminals of these electrodes, and means for providing an enveloping curtain of gas about the arcing terminals of these electrodes and about the work being welded.

A further object of my invention is to provide automatic means for simultaneously feeding the electrodes to and from one another to establish and maintain an arc therebetween, with which is associated additional means for independently adjusting said electrodes.

My invention will be better understood from the following description taken in connection with the accompanying drawings, and its scope will be pointed out in the appended claims.

In the drawings, Fig. 1 is a perspective view of a welding head embodying my invention; Fig. 2 is a side view of the same; Fig. 3 is a side view partly in section of the nozzle or torch of the machine shown in Figs. 1 and 2; Fig. 4 is a sectional view of Fig. 3 taken along the lines 4—4; Fig. 5 is a sectional view of a modified form of the nozzle shown in Fig. 3; Fig. 6 represents in detail the particular arrangement of the arcing terminals of the electrodes relative to one another by means of which I am able to obtain a particularly stable arc; and Fig. 7 is a diagrammatic view of the automatic feeding arrangement employed in the welding head shown in Figs. 1 and 2, showing the control circuits for the motor employed for feeding the electrodes to and from one another.

The welding head shown in Figs. 1 and 2 is adapted for automatically feeding a plurality of electrodes 1, 2 toward and away from one another to strike and maintain an arc and for supplying through a nozzle 3 across the arc and about the arc a gaseous atmosphere in which or by means of which the welding operation is performed. The electrodes are supported in holders 4 and 5 to which current is supplied through flexible conductors 6 and 7. These conductors are attached to bus bars 8 and 9 to which a suitable source of electromotive force, not shown in the drawings, is connected through connections illustrated at 10 in Fig. 2. The bus bars 8 and 9 are attached to a casing 11 by electrically insulating supports 12 and 13 which are secured by means of bolts 14 and 15 to lugs 16 forming part of the casing. Interposed between the lugs 16 and supports 12 and 13 is a plate 17 adapted to act as a heat insulating means. The base portion of casing 11 may be water-cooled for the accomplishment of the same result. Casing 11 and a complementary casing 18 totally enclose the electrode feed motor 19 which through gearing, also enclosed within the casings 11, 18, operates gears 20 and 21 and racks 22 and 23 to feed the electrodes. The racks 22 and 23 are supported by, but insulated from, rods 22' and 23' attached to the electrode holders 4 and 5, thereby insulating the electrodes from one another and from the frame of the welding head.

Referring to Fig. 1 and the diagrammatic illustration of Fig. 7, it will be seen that electrode 1 is fed by motor 19 through worm 24, worm wheel 25, beveled gears 26 and 27, worm 28, worm wheel 29, gear 20 and rack 24, and that electrode 2 is fed by the motor 19 through worm 24, worm wheel 25, beveled gears 26 and 30, worm 31, worm wheel 32, gear 21 and rack 23. Normally beveled gear 30 is forced into engagement with beveled gear 26 by means of a spring 33 compressed between a collar on shaft 35 and the worm 31, but the driving connection may be interrupted by withdrawing gear 30 from mesh with gear 26 through the agency of a knob 34 extending outside of the casing 11. The worm 31 is splined on the shaft 35 to which gear 30 and knob 34 are attached so that this disengagement may readily be accomplished without rotating worm 31. When the gears 26 and 30 are thus disengaged by turning knob 34, electrode 2 may be adjusted independently of the feeding operation of electrode 1 by motor 19 through the gearing previously described. However, when gears 30 and 26 are in mesh both electrodes 1 and 2 are simultaneously fed at the same rate by feed motor 19 through the gearing just described. The independent control of electrode 2 through the agency of knob 34 thus enables the welding operator to adjust the electrodes relatively to one another if for any reason they are consumed in the welding arc at unequal rates.

The feed motor 19 illustrated in the drawings is of the type known as a split field series motor. It is provided with two fields 36 and 37. When current is supplied through field 36 the motor rotates in one direction, and when current is supplied through field 37 it rotates in the reverse direction. The motor is supplied with current through conductors 38 and 39, and the connection through fields 36 and 37 is determined by a relay illustrated in the drawings as a voltage relay 40 whose operating coil 41 is connected across the arc established between electrodes 1 and 2 by being electrically connected to the electrode holders 4 and 5. The voltage of the arc automatically maintained between electrodes 1 and 2 depends upon the calibration of relay 40 which may be made adjustable by connecting in circuit therewith adjustable rheostats not shown in the drawings. The adjustment is such that when the arc voltage is too low, the operating coil 41 of the relay permits the movable contact 42 of the relay to engage the fixed contact 43 to complete the feed motor circuit from conductor 39 through movable contact 42, fixed contact 43, conductor 44 and field 37 to conductor 38 for operating motor 19 in a direction to separate electrodes 1 and 2, and when the arc voltage is too great, the operating coil 41 of the relay raises the movable contact 42 into engagement with the fixed contact 45 to complete the circuit of the feed motor from conductor 39 through movable contact 42, fixed contact 45, conductor 46 and field 36 to conductor 38 for operating motor 19 in the reverse direction to feed the electrodes toward one another. Thus, assuming that the electrodes are not in engagement and a suitable source of welding current is supplied to these electrodes, the relay 40 will first operate to complete the circuit through contacts 45 to feed the electrodes into engagement with one another. As soon as the electrodes engage one another, coil 41 of relay 40 is short circuited, and movable contact 42 will fall to the position illustrated in the drawings, completing a circuit through field 37 to feed the electrodes away from one another and thereby strike an arc between them. When the electrodes have separated to such an extent that the arc maintained between them is of the desired voltage, coil 41 of relay 40 will be sufficiently excited to move contact 42 out of engagement with contact 43, thus deenergizing the feed motor. As soon as the arc length and voltage increase due to the consumption of the electrodes, contact 42 will again be brought into engagement with contact 45 through the agency of coil 41, and the feed motor will again be energized for rotation in a direction to feed the electrodes toward one another. As soon as the correct voltage is again established however, contact 42 will assume a neutral position between contacts 43 and 45, and the feed motor will come to rest. It will thus be seen that I have provided means for automatically feeding electrodes 1 and 2 toward and away from one another to strike and maintain a welding arc between them.

Referring again to Figs. 1 and 2, it will be noted that electrodes 1 and 2 extend through insulating bushings 47 and 48 in a hood 49 forming part of the nozzle 3, the body portion of which is attached by means of a bracket 50 to the casing 11. The construction of the nozzle 3 is more completely shown in the sectional view of Fig. 3 and will be more fully described below in connection with that figure. Nozzle 3 may be rotated in its bracket 50 to a limited extent by means of worm 51 and a worm wheel segment 52. Segment 52 is attached to nozzle 3 and worm 51 to a shaft extending through lug 16 and terminating in a knurled knob 53 by means of which the worm 51 may be rotated about its axis to feed the worm wheel segment in one direction or the other to rotate nozzle 3 in its bracket 50. The electrodes are supported, as has already been described, by holders attached to racks 22 and 23 supported from the casing 11 at gears 20 and 21. Thus when nozzle 3 is rotated about its axis, the arcing terminals of the electrodes are displaced laterally from one another by reason of the rotation imparted to them by their engagement with hood 49 through the agency of the bushings 47 and 48.

I have found that by laterally displacing the arcing terminals of the electrodes with respect to one another by laterally displacing the electrodes from a common vertical plane into two different vertical planes, as more clearly shown in Fig. 6, I am enabled to produce an arc which is much more stable in operation than is the arc produced between electrodes lying in the same vertical plane with one another. When the electrodes lie within the same vertical plane the arc tends to waver through an angle approaching 180°. With the electrodes offset as shown in Fig. 6, the arc assumes a very steady position in a plane approximately 90° to that of the electrodes as shown in dotted lines in Fig. 6. This stability results from a tensioning effect produced by the magnetic field about the electrodes and the arc. The arc as initially struck extends directly from one electrode to the other. It is however inclined to each of the arcing terminals of the electrodes and due to the crowding of flux on one side of the arc relative to that on the other is immediately distorted into the shape shown in Fig. 6. Because of the inclination of the electrodes one to the other, there is a similar flux crowding above the arc which deflects it downwardly as shown in Fig. 6. The flux distribution about the arc thus distorts the arc, as shown, by placing it under tension, which causes it to operate more stably. The amount of lateral offset to be given the electrodes for most satisfactory operation will vary with the operating conditions encountered in use depending upon the current values employed, the size of the electrodes used and similar factors. For $\tfrac{1}{16}$-inch electrodes with current values between 40 and 100 amperes, I find that a lateral offset of one-eighth inch gives the best operating conditions. It is not necessary to incline the electrodes as shown in Fig. 6 to cause the arc to be deflected downwardly, since the same result can be obtained by placing the electrodes in the same horizontal plane with their arcing terminals laterally displaced from one another by displacing the electrodes into different vertical planes and directing a jet of gas across their arcing terminals to blow the arc in a downward direction. Instead of jets of gas, blowing magnets may also be used to accomplish this same result, although it is preferable to incline the electrodes as illustrated in the drawings to obtain this blowing effect rather than to employ auxiliary magnets.

The planes of references above employed in describing my invention as applied to a vertically disposed torch, such as illustrated in the drawings, will be interchanged when employed with reference to a horizontally disposed torch. According to my invention the electrodes are supported in convergent positions relative to a line of convergence with their arcing terminals laterally displaced with respect to each other in the direction of said line of convergence, and the planes of reference employed have been used in order more easily to describe my invention with regard to the particular embodiment shown in the drawings.

The welding head may be supported for movement relative to the work to be welded and the arcing terminals of the electrode may be adjusted laterally and longitudinally of the seam to be welded by means such as illustrated in Figs. 1 and 2. This means comprises a hand-wheel 54 operating through a shaft 55 and a worm 56 which engages a worm wheel 57 attached to a shaft 58 to move the welding head about the axis of the shaft 58 and a hand-wheel 59 operating through a shaft 60 and a worm 61 which engages a worm wheel 62 attached to the shaft 62' of a bracket 63 for supporting the welding head to rotate the head about the axis of the shaft 62'. The bracket 63 may be attached to a fixed or movable support 64, only a portion of which is shown in the drawings.

The construction of the nozzle or torch 3 is shown in Figs. 3 and 4. It comprises an inner pipe 65 and an outer pipe 66. The inner pipe is supported in seats 67' and 68' of a cap 67 and a plug 68. Cap 67 encloses one end of pipe 66 and plug 68 coacts with the discharge end of this pipe to form one of the openings 69 in the tip of the nozzle. The other opening 70 is formed by a passageway extending through plug 68. Gas is supplied through passageway 69 from a suitable source not shown through pipe 71, nipple 72, pipe 66 and passageways 73 in plug 68. Gas is supplied through opening 70 from a source not shown through pipe 74, cap 67 and pipe 65. Plug 68 is provided with a deflector 75 which directs the gas supplied through pipe 66 laterally of hood 49 into engagement with its depending edges 76, from which it is again deflected toward the work forming an enveloping gas curtain within which the work being welded and the arcing terminals of the electrodes 1 and 2 are enclosed in a low velocity gas stream which diffuses inwardly from the gas curtain which is spaced from and about the arcing terminals of the electrodes. Pipes 65 and 66 are enclosed in a third pipe 77 through which a cooling medium is supplied to the hollow hood 49 of nozzle 3. Pipe 66 is provided with flanges 82, as shown in Fig. 4, to separate the space between the pipes 66 and 77 into two passageways through which the cooling fluid is supplied from pipes 78 and 79 attached to pipe 77 through nipples 80 and 81.

The electrodes 1 and 2 are guided through the hood 49 by bushings held in thimbles 83 located therein. These bushings are of insulating material and are in two parts. One of the bushings is provided with a thread which engages a thread in the thimble 83 by means of which the bushings are held in place in the thimbles. A packing 84 inserted between the bushings about the electrode serves to prevent air from flowing along the electrodes toward the tip of the nozzle thus prohibiting the admixture of air with the gas used for protecting the arcing terminals of the electrode and the work being fused.

The construction of the torch may be modified as shown in Fig. 5. In the torch head shown in this figure the hood 49 has been provided with inturned double-walled depending edges 85, with a different nozzle construction employing a conical deflector 86 and with a different bushing and thimble construction for holding the electrodes in the hood. The inturned edges 85 serve to deflect inwardly gas supplied down and along the inside portions of the hood 49. The particular nozzle construction illustrated in Fig. 5 is in accordance with the invention of Irving F. Weller, described and claimed in his application, Serial No. 534,302 for welding apparatus, filed concurrently herewith, and assigned to the same assignee as the present application. By employing a conical deflector such as illustrated in conjunction with a flared opening in the outlet end of pipe 66, an outwardly flared annular orifice is provided which supplies gas about the arcing terminals of the electrode in an appropriate manner to produce a bulbous flame which totally encloses the electrodes and that portion of the work being welded. The bushing and thimble construction differs from that shown in Fig. 3 by employing bushings 87 of like configuration which are held in place in thimbles 88 by nuts 89 screwed on to the thimbles.

The embodiment of the invention illustrated in the accompanying drawings has been selected for clearly setting forth the principles involved. It will be apparent, however, that the invention is susceptible to being modified to meet the different conditions encountered in its use. I therefore aim in the appended claims to cover all modifications which fall within the true spirit and scope of my invention.

What I claim as new and desire to secure by Letters Patent of the United States is:

1. Welding apparatus comprising means for holding a plurality of electrodes in convergent positions relative to a line of convergence with their arcing terminals laterally displaced with respect to each other in the direction of said line of convergence.

2. Welding apparatus comprising means for holding a plurality of electrodes in convergent positions relative to a line of convergence with their arcing terminals laterally displaced with respect to each other in the direction of said line of convergence, and means for varying said lateral displacement.

3. Welding apparatus comprising means for supporting a plurality of electrodes in convergent positions relative to a line of convergence, and means for moving said supports relatively to one another to displace the arcing terminals of said electrodes laterally with respect to one another in the direction of said line of convergence.

4. Welding apparatus comprising a plurality of electrode holders, guiding means for holding said electrodes in convergent positions relative to a line of convergence, and means for displacing said guiding means relatively to each other and for laterally displacing the arcing terminals of said electrodes relatively to one another in the direction of said line of convergence.

5. Welding apparatus comprising means for supporting a plurality of electrodes in inclined positions relative to one another said means including a hood which engages said electrodes and through which said electrodes project, and means for rotating said hood for laterally displacing the arcing terminals of said electrodes relatively to one another.

6. Welding apparatus comprising means for supporting a plurality of electrodes, and means for deflecting first laterally and then toward the work gas supplied from behind the arcing terminals of sa'd electrodes to form a protective curtain of gas spaced from and about the arcing terminals of said electrodes.

7. Welding apparatus comprising means for supporting a plurality of electrodes, means for deflecting first laterally and then toward the work gas supplied from behind the arcing terminals of said electrodes to form a protective curtain of gas spaced from and about the arcing terminals of said electrodes, and means for directing a blast of gas across the arcing terminals of said electrodes.

8. Welding apparatus comprising a plurality of electrode holders, and means for producing an enclosing curtain of gas spaced from and about the portions of the electrodes extending from said holders.

9. Welding apparatus comprising a hood having an opening therein for an electrode, and means for supplying from the edge portions of said hood a protective curtain of gas which encloses the arcing terminal portion of said electrode which extends toward the work from said hood.

10. Welding apparatus comprising means for supporting a plurality of electrodes, a hood located above the arcing terminals of said electrodes, means in said hood for directing a jet of gas across the arcing terminals of said electrodes into engagement with the work to be welded, and means cooperating with said hood for directing an enveloping curtain of gas about the work and the arcing terminals of said electrodes.

11. Welding apparatus comprising a plurality of electrode holders, a hood located above the arcing terminals of said electrodes, and means cooperating with said hood for directing an enveloping curtain of gas about the work being welded and the arcing terminals of said electrodes.

12. Welding apparatus comprising a plurality of electrode holders, a hood with depending edges located above the arcing terminals of said electrodes, means for directing gas across the arcing terminals of said electrodes into engagement with the work, and means in said hood for deflecting gas toward and down the depending edges of said hood toward the work to form an enveloping curtain of protective gas about the work being welded and the arcing terminals of said electrodes.

13. Welding apparatus comprising means for supporting a plurality of electrodes, a bell-shaped hood with depending inturned edges located above the arcing terminals of said electrodes, means for directing a jet of gas across the arcing terminals of said electrodes into engagement with the work, and means cooperating with said hood for deflecting gas toward and down the depending edges of said hood toward the work being welded and about the arcing terminals of said electrodes.

14. Welding apparatus comprising a plurality of electrode holders, a double-walled hood with depending edges located above the arcing terminals of said electrodes, means for directing gas across the arcing terminals of said electrodes, means cooperating with said hood for deflecting a curtain of shielding gas toward the work and about the arcing terminals of said electrodes.

15. Welding apparatus comprising means for supporting a plurality of electrodes, a hood above the arcing terminals of said electrodes through which said electrodes project, means for directing a jet of gas across the arcing terminals of said electrodes, means cooperating with said hood for deflecting a shielding curtain of gas about the work being welded and the arcing terminals of said electrodes, and gas-tight packings in said hood about said electrodes.

16. In a gas-arc welding torch, electrode supporting means, and means for supplying gas to and about the arcing terminals of electrodes in said supporting means comprising a pipe, a second pipe within said first pipe, one end of which is seated in a cap which seals one end of said first-mentioned pipe and through which gas is supplied to said second pipe, the other end of which is seated in a deflector having a passageway therein connected with the passageway in said second pipe and passageways connecting the interior of said first pipe with the discharge opening formed between said deflector and the discharge end of said first pipe, said deflector and cap being adjustable along the length of said first pipe for controlling the size of the discharge outlet formed between said deflector and said first pipe, and means for supplying gas to said pipes.

17. Welding apparatus comprising a plurality of electrode holders, automatic means for simultaneously feeding said electrode holders toward or away from one another to control a welding arc established between electrodes supported by said holders, and hand-operated means for disengaging the driving connection of one of said electrode holders from said automatic means and for independently adjusting said electrode holder.

JAMES T. CATLETT.